United States Patent
Escowitz et al.

(10) Patent No.: US 12,049,049 B2
(45) Date of Patent: Jul. 30, 2024

(54) COMPACTION METHOD FOR COMPOSITE DISCS

(71) Applicant: Arris Composites Inc., Berkeley, CA (US)

(72) Inventors: Ethan Escowitz, Berkeley, CA (US); Riley Reese, Oakland, CA (US); Erick Davidson, Piedmont, CA (US); J. Scott Perkins, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 120 days.

(21) Appl. No.: 17/097,801

(22) Filed: Nov. 13, 2020

(65) Prior Publication Data

US 2021/0138744 A1 May 13, 2021

Related U.S. Application Data

(60) Provisional application No. 62/934,950, filed on Nov. 13, 2019.

(51) Int. Cl.
*B29C 70/46* (2006.01)
*B29C 69/02* (2006.01)
*B29C 70/54* (2006.01)
*B29K 105/08* (2006.01)

(52) U.S. Cl.
CPC ............ *B29C 70/465* (2013.01); *B29C 70/54* (2013.01); *B29K 2105/0881* (2013.01)

(58) Field of Classification Search
CPC ................. B29C 70/465; B29C 70/54; B29C 2043/3615; B29C 43/361; B29C 43/14; B29C 43/08
See application file for complete search history.

(56) References Cited

U.S. PATENT DOCUMENTS

| | | | |
|---|---|---|---|
| 4,892,772 A * | 1/1990 | Su | B32B 27/04 428/113 |
| 10,926,489 B2 | 2/2021 | Davidson et al. | |
| 10,946,595 B2 | 3/2021 | Davidson et al. | |
| 11,090,883 B2 | 8/2021 | Pelman et al. | |
| 2020/0108568 A1 | 4/2020 | Davidson et al. | |
| 2020/0114596 A1 | 4/2020 | Davidson et al. | |

OTHER PUBLICATIONS

Groves, D.J., A characterization of shear flow in continuous fibre thermoplastic laminates, Composites, vol. 20, No. 1 (Jan. 1989), pp. 28-32. (Year: 1989).*
Zachariades, A.E. and J. Economy, Super Strong Polymers in Planar Directions, Polymer Engineering and Science, vol. 23, No. 5 (1983), pp. 266-270. (Year: 1983).*

* cited by examiner

*Primary Examiner* — Matthew J Daniels
(74) *Attorney, Agent, or Firm* — Kaplan Breyer Schwarz, LLP

(57) ABSTRACT

Method and apparatus for splaying fibers for the forming preform charges for the production of composite discs, and for the production of composite disc, wherein rotary compaction is applied to an appropriately arranged assemblage of preforms.

18 Claims, 6 Drawing Sheets

COMPACTION METHOD FOR COMPOSITE DISCS

STATEMENT OF RELATED CASES

This specification claims priority of U.S. 62/934,950, which was filed Nov. 13, 2019 and is incorporated by reference herein.

BACKGROUND

The precursor materials used to fabricate composite parts—fiber and polymer resin—come in a variety of legacy form factors. This variety arises because each form factor has certain pros and cons, particularly in light of the available processing techniques. For example, the flat form factor of prepreg tapes or sheets is well suited for molding parts having flat-planar geometries, as are often formed from compression molding, but not for parts having complex geometries. On the other hand, pellets comprising short, chopped fiber are better suited for parts having complex geometries, as are often made by injection molding, but result in parts having inferior mechanical properties compared to those comprising continuous fibers.

Regardless of the form factor of the precursor materials or the manner in which they are processed, a resulting composite part will possess varying degrees of anisotropy, which is directly attributable to its constituent fibers and the extent of their alignment. Injection-molded parts, which have short, randomly oriented fibers, will typically exhibit less anisotropy than laminate parts, which typically have long, at least somewhat aligned, continuous fibers. To the extent anisotropy may be desirable, it usually is accompanied by some sacrifice in mechanical properties. Thus, for a given part, the prior art seeks optimize/balance the parameters of fiber length, processing technique, and raw-material form-factor to achieve a desired part performance.

One category of composite parts—high performance gaskets and seals—has proven elusive for such optimization efforts. Typical of the use case for parts such as these, which have a circular or round-planar geometry, is a need to withstand significant pressures and fatigue cycles. Such parts would therefore benefit from having long, continuous fibers throughout, and relatively a lesser degree of anisotropy. But given the existing form factors for composite precursors, and the techniques available for processing such materials, it is prohibitively difficult to produce, particularly in quantity, parts having round planar geometries and possessing such long, continuous fibers and exhibiting a relatively lesser degree of anisotropy.

The difficulty in producing such parts primarily results from geometrical and material form-factor constraints. Many gaskets and seals, although having circular geometries, include complex features that are used to locate, fit, or attach them into broader assemblies. Historically, such complex features are best produced through injection molding, which, by virtue of the equipment and processing, requires the use of chopped fibers. As previously noted, chopped fiber, due to its short length and random orientation, is a less-ideal precursor material from the perspective of the resulting part's mechanical properties. Planar circular features can be produced through laminate processes by offsetting the various plies of the laminate with respect to one another, thereby providing groups of relatively longer fibers that are at least aligned with one another. But such processes cannot achieve the requisite intricacy of the entire geometry, and tend to exhibit a relatively high degree of anisotropy.

Thus, there is no efficient process in the prior art for producing composite parts having a circular geometry, while also possessing intricate geometries, demonstrating high-strength performance, and a relatively lesser degree of anisotropy.

SUMMARY OF THE INVENTION

The present invention provides a way to fabricate parts formed from fiber/resin, and having generally round-planar geometries (e.g., circular, oval, etc.), or possessing major features having such geometries, (hereinafter collectively "composite discs"), and which avoid the shortcomings of the prior art. Methods in accordance with the present teachings are able to mold composite discs that: (a) incorporate long fibers, (b) result in desired fiber alignment (i.e., one the provides excellent mechanical properties while maintaining a relatively low-level of anisotropy), and (c) include complex features, if required.

The desired fiber alignment for a disc will include individual continuous fibers in which a portion of a given fiber has a substantially radial alignment with respect to the disc, yet has a non-linear form, thereby reducing anisotropy. Additionally, the disc may include a group of mutually aligned, substantially linear continuous fibers, and another group of fibers, generally shorter than the previously mentioned groups, and which extend into any intricate features that are associated with the composite disc.

In addition to any other benefits, methods in accordance with the invention enable a far more efficient way to produce composite discs. Moreover, the present methods enable the manufacture of composite discs having intricate features, yet nevertheless possessing high strength. Furthermore, in comparison to prior-art composite discs that include continuous fibers, such as may be formed via the compression molding of laminates, composite discs in accordance with the present teachings will possess a lesser degree of anisotropy, while exhibiting excellent mechanical properties.

Embodiments of the invention splay the preforms/fibers to create the desired fiber alignment. During splaying, preforms and fibers that were originally straight/linear are contorted into a form/shape similar to the letter "s". In some embodiments, the preforms/fibers are splayed in-situ during the molding process. In some other embodiments, the preforms/fibers are splayed before the molding process; that is, a splayed precursor material is formed that can then be compression molded. The splayed fibers reduce anisotropy due to their non-linear shape.

With respect to splaying in-situ, and as applied to a compression molding process, a unique rotary degree-of-freedom is incorporated into the compression molding process. This is in addition to the linear degree-of-freedom, which is used to compact the precursor materials during compression molding.

In the illustrative embodiment, both of these degrees-of-freedom are implemented via piston/plunger, wherein the axis of rotation is parallel to the axis of compression. Relative rotation between the mold and plunger results in the application of a shear stress to precursor materials (fiber/resin) in the mold cavity during the melt-flow phase. This causes the preforms/fibers to splay, adopting the desired shape. Relative vertical movement between the mold and the plunger applies pressure to achieve compaction of the precursor materials. In the illustrative embodiment, the plunger moves (both rotationally and linearly), whereas the mold is stationary. In some other embodiments, the mold is moved, or both the plunger and the mold are moved.

With respect to embodiments in which a splayed precursor material is formed, shear stress is applied during the creation of a "preform charge." A preform charge is a precursor material used by applicant in its compression molding processes. A preform charge is an assemblage of fiber-bundle-based preforms that are at least loosely bound together so as to maintain their position relative to one another. The preform charge is typically formed in a fixture that is distinct from the compression mold. In the context of the present invention, the preform charge fixture would typically be in a form similar to a mold cavity. Preforms are placed in the cavity in an arrangement such that, with the application of shear stress and a relatively limited amount of compressive force, the individual preforms are splayed, and then tacked together. The tacking process may require the addition of supplemental resin (supplementing the resin that is already present in the preforms), since the preforms may abut one another along only a relatively limited portion of their length, and may require the creation of a temporary "matrix" or "web" to couple non-abutting portions of the individual preforms.

In an alternative embodiment of the second approach, individual preforms are formed with a shape that is similar to the shape that is created (in the other embodiments) via the application of shear stress. More particularly, a bending machine is used to bend lengths of towpreg, etc., into a form that is similar to the form that results from splaying. Those preforms are then arranged in a mold cavity (i.e., a lay-up of individual preforms is placed in the mold), and pressure is applied to consolidate the material via compression molding protocols to form a composite disc, and without the application of shear stress. Alternatively, the shaped preforms are arranged in an external fixture, then tacked together to form a preform charge. The perform charge is then placed in a mold cavity and pressure is applied to consolidate the material via compression molding protocols, again without the application of shear stress.

With respect to the aforementioned alternative embodiment, it is the inventors' belief that it is substantially more efficient to splay fibers during molding or preform-charge formation as per the present invention, rather than forming complex preform shapes. By splaying preforms, either in the form of a lay-up or a preform charge, during rotary compaction, the desirable fiber alignment is more efficiently attained.

In some embodiments, the invention provides a method comprising the operations of:
  providing an assemblage of preforms, each preform in the assemblage comprising resin and a plurality of substantially unidirectionally aligned, and substantially equal length fibers;
  heating the assemblage of preforms; and
  applying compaction pressure and rotationally induced shear stress to the preforms, wherein the assemblage of preforms has a configuration that is suitable for splaying via rotationally induced shear stress.

In some embodiments, the invention provides a molding tool having:
  a cavity for receiving an assemblage of preforms;
  a heater, wherein the heater is positioned to heat the assemblage of preforms; and
  a plunger for imparting compaction pressure and rotationally indued shear stress to the assemblage of preforms.

Summarizing, the invention provides a method of rotary compaction for forming composite discs, and preform charges suitable for forming composite discs. Methods and apparatus in accordance with the present teachings apply compaction pressure and rotationally induced shear stress to an assemblage of preforms, Embodiments of the method and apparatus may further include additional features disclosed herein and the appended drawings.

DETAILED DESCRIPTION

The following terms, and their inflected forms, are defined for use in this disclosure and the appended claims as follows:
  "Fiber" means an individual strand of material. A fiber has a length that is much greater than its diameter. For use herein, fibers are classified as (i) continuous or (ii) short. "Continuous fibers" have a length that is no less than about 60 percent of the length of a mold feature or part feature where they will ultimately reside. Hence, the descriptor "continuous" pertains to the relationship between the length of a fiber and a length of a region in a mold or part in which the fiber is to be sited. For example, if the long axis of a mold has a length of 100 millimeters, fibers having a length of about 60 millimeters or more would be considered "continuous fibers" for that mold. A fiber having a length of 20 millimeters, if intended to reside along the same long axis of the mold, would not be "continuous." Such fibers are referred to herein as "short fibers." The term "short fiber," as used herein, is distinct from the "chopped fiber" or "cut fiber," as those terms are typically used in the art. In the context of the present disclosure, short fibers are present in a preform (of the same length), and substantially all short fibers in the preform are unidirectionally aligned. As such, the short fibers will have a defined orientation in the preform layup or preform charge in the mold and in the final part. As used in the art, "chopped" or "cut" fiber has a random orientation in a mold and the final part. Returning to the example of the 20-millimeter fiber, it is notable that if that fiber is intended for a feature in the mold having a length of about 20 millimeters, then the fiber would be considered to be "continuous." For features that are smaller than the overall size of the mold, the fibers will typically be somewhat longer than the feature, to enable "overlap" with other fibers. For a small feature, the overlap amount could represent the major portion of the length of the fiber.

"Fiber bundle" means plural (typically multiples of one thousand) unidirectionally aligned fibers.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"Tow" means a bundle of unidirectional fibers, ("fiber bundle" and "tow" are used interchangeably herein unless otherwise specified). Tows are typically available with fibers numbering in the thousands: a 1K tow (1000 fibers), 4K tow (4000 fibers), 8K tow (8000 fibers), etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a segment of plural, unidirectionally aligned fibers. The segment is cut to a specific length, and, in many cases, will be shaped (e.g., bent, twisted, etc.) to a specific form, as appropriate for the specific part being molded. Preforms are usually sourced from towpreg (i.e., the towpreg is sectioned to a desired length), but can also be from another source of plural unidirectionally aligned fibers (e.g., from a resin impregnation process, etc.). The cross section of the preform, and the fiber bundle from which it is sourced, typically has an aspect ratio (width-to-thickness) of between about 0.25 to about 6. Nearly all fibers in a given preform have the same length (i.e., the length of the preform) and, as previously noted, are unidirectionally aligned. The modifier "fiber-bundle-based" or "aligned fiber" is often pre-pended, herein, to the word "preform" to emphasize the nature of applicant's preforms and to distinguish them from prior-art preforms, which are typically in the form of segments of tape or in the form of a shape cut from sheets of fiber. Applicant's use of the term "preform" explicitly excludes any size of shaped pieces of: (i) tape (typically having an aspect ratio—cross section, as above—of between about 10 to about 30), (ii) sheets of fiber, and (iii) laminates. Regardless of their ultimate shape/configuration, these prior-art versions of preforms do not provide an ability to control fiber alignment in a part in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based/aligned fiber) preforms that are at least loosely bound together ("tacked") so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 150-300 psi (which will typically be the destination for a preform-charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

"About" or "Substantially" means+/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Feed constituents/Precursor Material. The feed constituents used in conjunction with the methods described herein include a plurality of fiber-bundle-based/aligned-fiber "preforms." Each fiber-bundle-based preform includes many individual, unidirectionally aligned fibers, typically in multiples of a thousand (e.g., 1 k, 10 k, 24 k, etc.). The fibers align with the major axis of their host preform. Substantially all fibers in a preform are the same length.

These fibers are typically sourced from a spool of towpreg. That is, the preforms are segments of towpreg, cut to a desired length and shaped, as appropriate for the application. As known to those skilled in the art, in towpreg, the fibers are impregnated with a polymer resin. In some other embodiments, the bundle of fibers can be sourced directly from impregnation processes, as known to those skilled in the art. Whatever the source, the fiber bundles, and hence the preforms, can have any suitable cross-section, such as, without limitation, circular, oval, trilobal, and polygonal.

The preforms may be formed using a cutting/bending machine. The formation of a preform involves appropriately bending towpreg, or some other source of a plurality of unidirectionally aligned resin-impregnated fibers, typically via a robot or other appropriate mechanism, then cutting the bent portion of the fiber bundle to a desired length. As appropriate, the order of the bending and cutting can be reversed. As used herein, the term "preform" means "fiber-bundle-based preform," as described above, unless otherwise indicated. For most embodiments for use in conjunction with the present invention, that preforms will simply be cut to a desired size, but not bent.

For use in conjunction with embodiments of the invention, the preforms will be organized into an assemblage have a specific structure/orientation/form. The assemblage of preforms can be implemented either as (1) a "preform charge," or (2) a "layup" of loose preforms.

A preform charge comprises one or more fiber-bundle-based preforms that are tacked (joined) together. The preform charge, which is typically a three-dimensional arrangement of preforms, is usually created in a fixture separate from the mold, and which is dedicated and specifically designed for that purpose. To create a preform charge, one or more preforms are placed (either automatically or by hand) in a preform-charge fixture, which, if appropriate, may be in the form of a mold cavity. By virtue of the configuration of the fixture, the preforms are organized into a specific geometry and then tacked together. Tacking can be performed by heating the preforms and then pressing them together. Other techniques for tacking/joining include ultrasonic welding, friction welding, lasers, heat lamps, chemical adhesives, and mechanical methods such as lashing.

After tacking, the preform charge is not fully consolidated. However, once the preforms are joined, they will not move, thereby maintaining the desired geometry and the specific alignment of each preform in the assemblage. The shape of the preform charge usually mirrors that of an intended part, or a portion of it. See, e.g., Publ. Pat. App. US2020/0114596 and U.S. patent application Ser. No. 16/877,236, incorporated herein by reference.

As indicated, as an alternative to using a preform charge, a layup (having the same configuration as the preform charge) of plural individual preforms is created in the mold cavity. However, for both process efficiency as well a substantially greater likelihood that the desired preform alignment is maintained, the use of a preform charge is preferred. As used in this disclosure and the appended claims, the term "assemblage of preforms" refers to either a "preform charge" or a "layup" of preforms, unless otherwise indicated.

In some embodiments, each preform in an assemblage of preforms has the same composition as all other preforms (i.e., the same fiber type, fiber fraction, and resin type). However, in some other embodiments, some of the preforms can differ from one another. For example, there may be instances in which different properties are desired at different regions within a complex part. For example, for a multi-layer assemblage, preforms in a particular layer may differ, in any of the characteristics above, from those in one or more other layers. And of course, preforms can differ in length and/or shape, as appropriate. Furthermore, if more than one assemblage of preforms is present in the mold cavity, the preforms in one assemblage can be the same or different than those in other assemblages in the cavity.

It is preferable, but not necessary, for all preforms to include the same resin. But to the extent different resins are used in different preforms or different assemblages, they must be "compatible," which means that they will bond to one another. A preform assemblage can also include inserts that are not fiber based.

The individual fibers in a preform can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used. Hybrid yarns consisting of twisted or commingled strands of fibers and polymer filaments can also be used as preforms.

Suitable resins for use in conjunction with the embodiments of the invention include any thermoplastic. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC).

General Considerations. The present method is applicable to the formation of any part that is formed from fiber and resin, and is disc-shaped, or includes a disc-shaped portion.

In a method in accordance with the illustrative embodiment, shear stress, such as may be imparted from relative rotation between a plunger/piston and a mold, is applied to an assemblage of preforms within the mold. The shear stress splays the preforms/fibers into a desired and desirable fiber shape/alignment. The assemblage of preforms must be organized so that it is suitable for splaying; that is, so that is will produce the desired fiber shape/alignment when splayed. Depending on the precise conditions of this operation (i.e., temperature and pressure), the result is either a finished part (fully consolidated precursor material) or a preform charge (partially consolidated precursor material).

It is notable that although the plunger or cavity must be capable of rotation, and be concentric with respect to its counterpart feature, the resultant part need not be entirely radially symmetric. In other words, in some embodiments, only a portion of the part will have a flat, round shape. This can be accomplished in a several ways.

For example, methods in accordance with the present teachings can produce parts having select round-planar regions by temporarily segregating one or more regions of the mold cavity to constrain the fibers that are subjected to the shear stress. For example, a ring having a diameter that is equal to the desired diameter of the disc-shaped region (and somewhat larger than the diameter/largest cross-sectional dimension of the preform-contacting surface of the plunger) is attached to plunger at a position that is advanced relative to (i.e., lower than) the plunger's preform-contacting surface. The means of attachment provides a resilience or spring bias. As the plunger approaches the assemblage of preforms in the mold cavity, the ring contacts the bottom of the mold as the preform-contacting surface contacts the preforms. The coupling, which may be a series of springs, enables the plunger to continue to advance (by compressing the springs) to consolidate the precursor material while the ring remains seated at the bottom of the mold. The ring constrains the fibers sourced from the preforms within its perimeter, while the shear stress splays those fibers. The piston and the ring are then retracted, and the liquefied resin (melt flow) from other portions of the mold flow towards the disc-shaped region to provide a uniform matrix for the part.

Alternatively, a part that is asymmetric but has a round-planar region can be molded by using the present method to form a preform charge in the shape of a disc, with the desired splayed preform/fiber alignment. In the case of the asymmetric part, this preform charge would be representative of only a portion (the round-planar region) of the part being formed. The preform charge is then placed in the mold in the region in which the round-planar geometry is to be formed. The constituents in the mold are then subjected to temperature and pressure in accordance with standard compression-molding protocols.

On a first-principle basis, the present invention is a union of heat, pressure, and relative rotation. Heat and pressure act in standard fashion for compression molding and/or preform-charge formation. The addition of relative rotation applies shear stress, during compaction, to the thermoplastic matrix once its temperature has been sufficiently elevated (different for preform-charge formation versus part formation). While the viscosity of a given thermoplastic will vary between a molding process on the one hand, and a preform-charge formation process on the other, the application of shear stress achieves the common action of fiber splaying and bending.

Despite the non-Newtonian (i.e., viscosity-dependent on shear rate) nature of thermoplastic melt flow, a no-slip condition (i.e., no relative velocity at fluid/surface boundary) is still present across mold surfaces at low rotational velocities. That is, at low rotational velocities, the melt-flow viscosity is minimally decreased, thus applying shear stress to the fluid across the mold surface.

In any scenario, the application of shear stress to a softened or melted thermoplastic composite will spread preforms/fibers accordingly. By applying such stress in a rotary fashion, fibers are splayed in a somewhat spiral pattern, as is desirable for relevant discs. The simultaneous application of relative rotation and compaction pressure (i.e., "rotary compaction") enables long fibers to be splayed and consolidated into desirable disc geometries with desired fiber arrangement. In accordance with embodiments of the invention such fiber arrangements will improve mechanical properties while simultaneously reducing anisostropy, relative to the composite discs produced in the prior art.

Rotary shear stress during compression molding is accomplished through unique molding mechanisms. Such mechanisms are capable of providing relative rotation, heat, and pressure simultaneously. In various embodiments, relative rotation is applied during compression either by: (i) rotating the plunger while mold (cavity) remains static, (ii) rotating the mold while the plunger remains static, or (iii) rotating the plunger and counter-rotating the mold. Mechanical control to implement such rotation can be implemented via any of a number of conventional approaches.

The rotation provided by a mold is facilitated by the arrangement of preforms being used. That is, the assemblage of preforms and the rotation are coupled so that preforms splay appropriately under rotation.

Important parameters for the process include, but are not limited to, degree-of-rotation (i.e., what portion of a full rotation), rotational velocity, heat, pressure, temperature gradient, and the time at which to rotate. For example, a rotary plunger could be heated above the temperature of the static cavity, so as to provide a thermal gradient for preferential splaying.

Parameters specified in the design of the assemblage of preforms include, but are not limited to, preform shapes, layup sequence, and preform location to: (i) accommodate shear splaying, and, as necessary (ii) to ensure that fibers that are to be flowed (throughout the mold) to specific locations in the mold will flow as desired, in accordance with other of applicant's methods.

Whereas applicant's existing methods would otherwise require complex preforms and assemblages thereof to achieve desired fiber alignments, the present method can, for example, splay straight preforms (e.g., sized, unbent segments of towpreg) that are arranged in a multi-layer 'asterisk' pattern, for example, to achieve the desired fiber arrangement. This is a preferred geometry for the preforms and the assemblage.

For parts requiring varied material properties through their thickness, such as a washer benefitting from tangential strength on one side and radial strength on the other, preform layups can be tailored to variably splay fibers through the thickness. Furthermore, it is notable that the greater the distance between a layer of preforms and the contacting surface of the plunger, the lesser the extent of fiber splaying. Thus, one or more layers of preforms that are relatively further from the plunger's preform-contacting surface can be arranged to provide a desired non-splayed fiber alignment, whereas layers of preforms that are relatively closer to the contacting surface will be splayed.

As previously noted, in some embodiments, the method provides a finished part; in some other embodiments, the method provides a preform charge with splayed preforms/fibers. Furthermore, these embodiments can be used in conjunction with each other. That is, after forming a preform charge by applying the present teachings, that preform charge can be placed in a mold and the splaying process continued to create the final desired fiber splaying for the finished part. It is notable that in embodiments in which a preform-charge disc is formed, it is primarily the preforms (as opposed to individual fibers) that are splayed. In embodiments in which a finished part is being molded, the fibers (from the preforms) are splayed.

Producing preform charges using the present teachings, as compared to a molding a finished part, requires less heat and pressure to accomplish the required amount of compaction, but similar rotation parameters are required. Preform charges derived in this manner will exhibit unioned and partially compacted preforms, wherein fibers from the preforms in contact with the rotary surface will splay accordingly. Notably, using the teachings to form a preform charge provides an ability to splay fibers without providing a source of shear stress (e.g., a rotating plunger, etc.) during the molding process. That is, based on the splayed arrangement of preforms in the preform charge, simple compression (no rotation) during molding can create the desired fiber arrangements.

When used during compression molding, as opposed to preform-charge formation, full heat and pressure is applied in accordance with known compression molding protocols. That is, a specified amount heat (dependent on the resin chosen) and pressure are applied to the materials within the mold by the molding apparatus for a period of time. The applied pressure is usually in the range of about 100 psi to about 300 psi, and temperature, which is a function of the particular resin being used, is typically in the range of about 150° C. to about 400° C. Rotation of, for example, the plunger occurs after the glass-transition temperature of the thermoplastic (in the preform/charge) is exceeded. Elevated pressure and temperature are typically maintained for a few minutes.

In embodiments of the invention in which a preform charge having splayed preforms is formed, grooves or other alignment features in the mold cavity, or on preform-contacting surface of the plunger, can assist in aligning preforms as desired.

In some embodiments, the method is used locally at one or more locations in a standard compression mold. In such embodiments, local regions of fiber splaying are desirable, such as locations at which fasteners, attachment points, etc., are present. At such points along a given mold surface, a rotating plunger would operate within the larger mold half, thus providing compaction and fiber splaying at any applicable location within the mold half.

Figure 3:
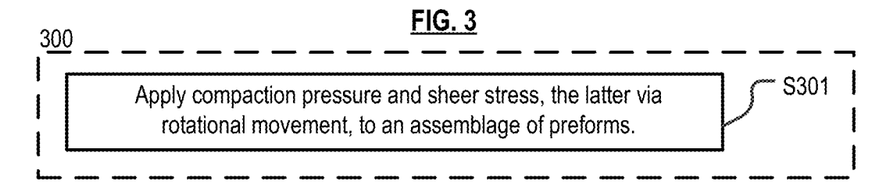
FIG. 3 depicts a method in accordance with an illustrative embodiment of the present invention.

Specific Embodiments. Turning now to FIG. 3, method 300 in accordance with the present teachings recites, in operation S301, applying compaction pressure and shear stress, the latter via rotational movement, to an assemblage of preforms. The method can be applied to the formation of a preform charge or a finished part.

Figure 7:
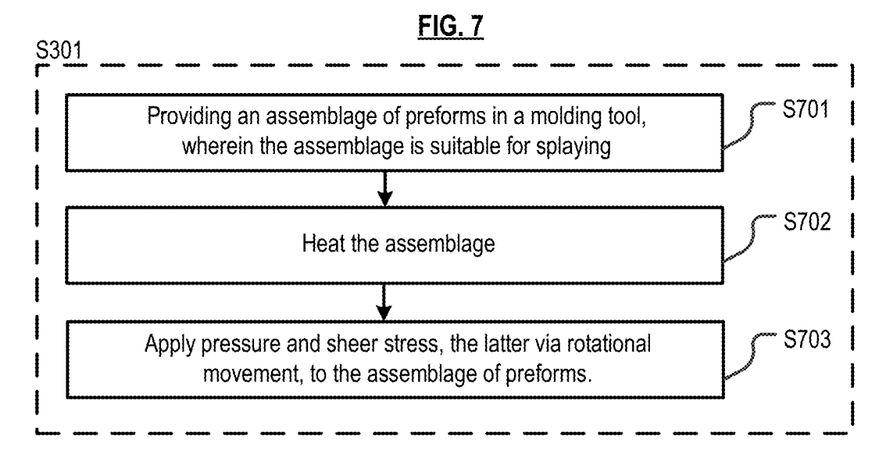
FIG. 7 depicts further operations of the method of FIG. 3.

Method 300 is further described with reference to FIG. 7. As indicated above, the method can be applied to form a preform charge or a finished part. The method is first described with respect to the formation of a preform charge. Operation S701 recites providing an assemblage of preforms in a molding tool, wherein the assemblage is suitable for splaying via rotationally induced shear stress. Configurations for such an assemblage are described in conjunction with respect to FIGS. 1 and 2A later in this specification. In this embodiment, the assemblage is a layup of individual preforms. Preforms are placed in the tool in an arrangement that is suitable for splaying.

In accordance with operation S702, the assemblage is heated. Since the method being applied to form a preform charge, the heating operation is intended to soften the preforms, as opposed to forming a melt flow, as during molding operations. Thus, the preforms are heated to a temperature that is greater than or equal to the heat deflection temperature of the resin (in the preforms), but less than the melting temperature thereof. The heat deflection temperature is unique to the thermoplastic resin being used. For example, for PA6 (nylon 6), the heat deflection temperature is about 320° F., and this is the temperature at which a PA6-based preform will soften.

In operation S703, pressure and shear stress are applied to the layup of preforms, the latter via rotational movement of, for example, a plunger. Because the method is being applied, in this embodiment, to the formation of a preform charge, the applied pressure is less than would be required for full compaction, such as during molding operations. By way of illustration, not limitation, the applied pressure for preform charge creation will typically be in the range of about 10 to 100 psi. Thus compressed, and softened, the shear stress, applied via rotational movement, will splay the preforms. The plunger, etc., which applies the stress, will typically twist about its rotational axis for no more than, and typical less than, one full rotation.

After this operation is complete, the preforms are cooled (either actively or passively). As the preforms cool, adjacent preforms "tack" or bond together, such that all preforms are joined, forming a preform charge. The tacking process may require the addition of supplemental resin (supplementing the resin that is already present in the preforms), since the preforms may abut one another along only a relatively limited portion of their length, and may require the creation of a temporary "matrix" or "web" to couple non-abutting portions of the individual preforms. In such a case, melted neat resin is added to the tool.

The preform charge created in accordance with method 300 can be added to a compression mold, and molding can proceed without additional rotary compaction. That is, the preform charge can simply be compacted, as in conventional compression molding. In some embodiments, additional rotary compaction can be applied to such a preform charge.

Figures 1, 2A, 2B, 2C:
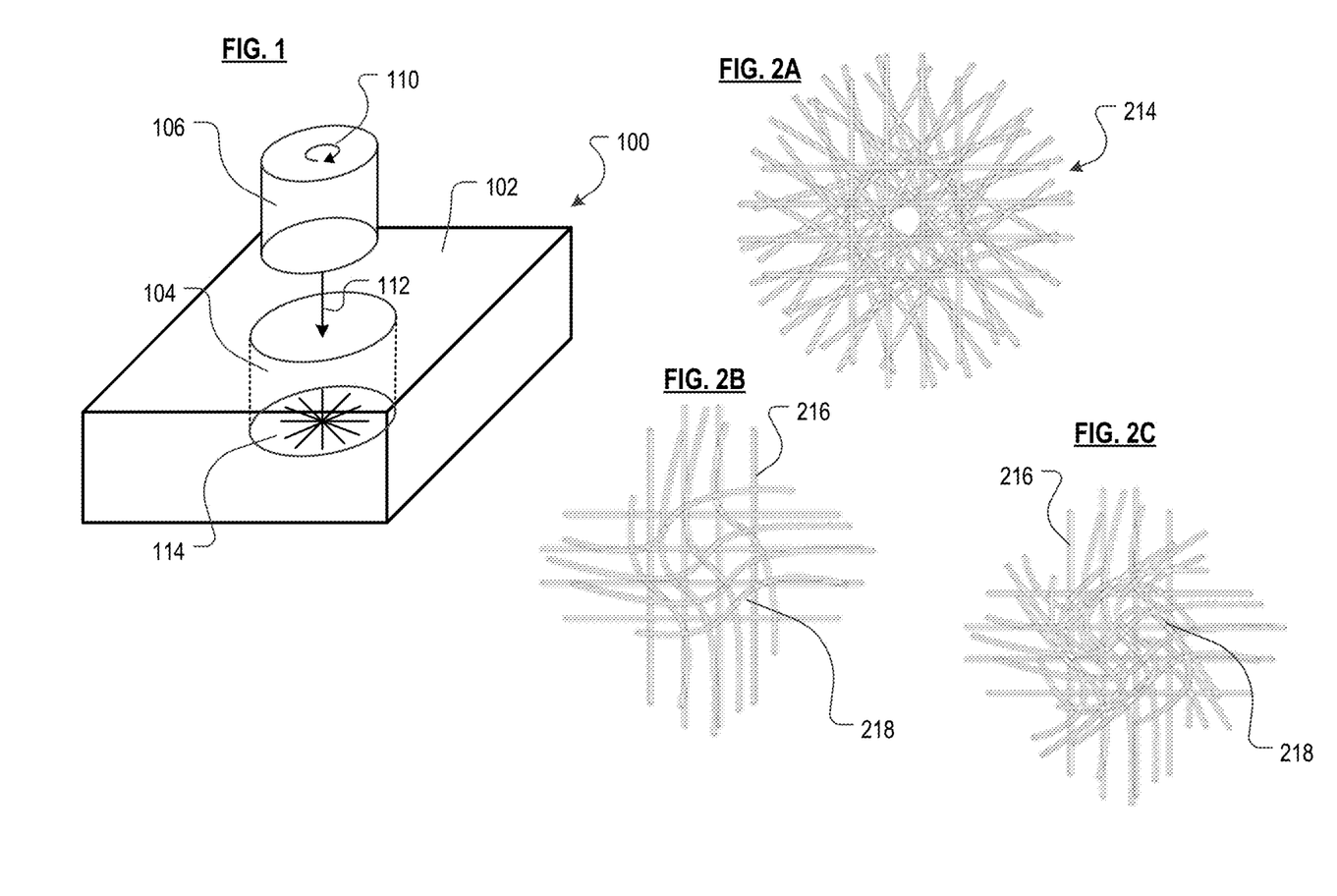
FIG. 1 depicts an illustrative embodiment of the present invention.
FIG. 2A depicts an illustrative assemblage of preforms, suitable for use in conjunction with embodiments of the invention.
FIG. 2B depicts the effect of the initial application of shear stress, as applied in accordance with the present teachings, to the assemblage of preforms shown in FIG. 2A.
FIG. 2C depicts the effect of further application of shear stress, as applied in accordance with the present teachings, to the assemblage of preforms shown in FIG. 2B.

The method is now described with respect to the formation of a finished part. Operation S701 recites providing an assemblage of preforms in a molding tool, wherein the assemblage is suitable for splaying. In this embodiment, the assemblage is a layup of individual preforms or a preform charge, either typically having a configuration such as depicted in FIG. 2A. That is, the arrangement is not splayed, although in some embodiments, the preform charge can have a splayed configuration.

In accordance with operation S702, the assemblage is heated. Since the method is being applied to form a finished part, the heating operation must melt the resin in the preforms. Thus, the preforms are heated to a temperature that is greater than or equal to the melting temperature of the resin. The melting temperature is unique to the thermoplastic resin being used, and is typically in the range of about 150° C. to about 400° C.

In operation S703, pressure and shear stress are applied to the assemblage of preforms, the latter via rotational movement of, for example, a plunger. Because the method is being applied, in this embodiment, to the formation of a finished part, the applied pressure must be sufficient for full compaction. Typical compaction pressure is between 100 to 300 psi. Having melted the resin, the fiber and resin are subjected to rotary compaction, such as applied by a plunger, which will splay the fibers (sourced from the preforms). The plunger, etc., which applies the compressive force and shear stress, will typically twist about its rotational axis for no more than, and typical less than, one full rotation. After carrying out the typical compression-molding protocols (elevated heat and pressure for several minutes), pressure is withdrawn and the part is cooled.

FIG. 1 depicts an illustrative embodiment of the present invention, wherein apparatus 100 carries out an embodiment of method 300. Apparatus 100 can be used either to create a preform charge, or to create a finished part.

Apparatus 100 includes mold 102, heater 103, mold cavity 104, and plunger 106. Assemblage 114 of preforms (i.e., either as a lay-up of individual preforms or as a preform charge) is formed and resides in cavity 104 of mold 102.

Plunger 106, shown outside cavity 102 for clarity, has two degrees-of-freedom: rotational 110 and linear 112.

Assemblage 114 has an "asterisk" arrangement, an embodiment of which is depicted in further detail in FIG. 2A. At least some of the preforms in assemblage 114 substantially spans the diameter of cavity 104. Although assemblage 114 is depicted in FIG. 1 as including a single layer of preforms, it would typically include plural layers, such as depicted in FIG. 2A.

Temperature of assemblage 114 is raised, via heater 103, sufficiently to cause the resin to soften or melt, depending upon the application (preform charge or finished part) for the method. This temperature will be different for different resins. Plunger 106 compresses assemblage 114 of preforms (linear degree-of-freedom 112) and imparts shear stress to the compressed assemblage via rotation (rotational degree-of-freedom 110). Compaction and shear stress, as imparted by the plunger, splays the preforms/fibers. Heater 103 can be a resistance heater, or any other conventional heating device, as is well known in the art. Additionally, the plunger 106 can be heated.

FIG. 2A depicts assemblage 214 of preforms, which is an embodiment of assemblage 114 suitable for use in conjunction with embodiments of the invention. More particularly, assemblage 214 is an arrangement of preforms that is "suitable for splaying via rotationally induced shear stress," by virtue of the way in which the preforms/fibers will bend upon the application of shear stress. Since it is desirable to provide a finished part with relatively low levels of anisotropy, the preforms in any given layer of assemblage 114 are advantageously, but not necessarily, arranged in a grid pattern. Moreover, in some embodiments, each successive layer of preforms in the assemblage is offset from the adjacent layer by an angle between 0° and 90° (e.g., 10, 15°, 17.5° 30°, 45°, etc.). As used in this specification and the appended claims, the phrase "suitable for splaying via rotationally induced shear stress" means that the assemblage of preforms are arranged so that when exposed to shear stress, the preforms, or fibers from the preforms, will adopt a curved form, such as an "s" shape. Furthermore, the preforms or fibers should cross/intersect one another, which is promoted by the aforementioned grid pattern. Preforms that are oriented out-plane with respect to the contact surface of the plunger are not, for example, suitable for splaying. Arrangements of composite ribbons or laminates comprising plural sheets of fiber and resin, are not suitable for use in conjunction with embodiments of the invention. Precursor materials having these form factors would not splay, as that term is used herein. Those skilled in the art will be able to determine, by simple experimentation, whether an assemblage of preforms has a configuration that is suitable for splaying via rotationally induced shear stress.

The term "alignment" is, at best, loosely applied to the plurality of splayed fibers resulting from the application of the method. There is, of course, a degree of randomness resulting from splaying, as the preforms/fibers are perturbed from their initial position in the assemblage. That desirable increases anisotropy. However, beginning with a grid-like assemblage increases the likelihood that the after splaying, the fibers will cross one another, many extending diametrically across the disk. This arrangement results in good mechanical properties.

FIG. 2B depicts top layer 218 and bottom layer 216 of preforms (for clarity) in assemblage 214, showing top layer 218 beginning to splay in response to the shear stress imparted by rotary compaction. FIG. 2C depicts top layer 218 of assemblage 214 subjected to further shear stress, as plunger 106 continues to rotate, with a concomitant increase in the amount of splaying. Due to its distance from the contact surface of plunger 106, lower layer 216 is not splayed, or only minimally splayed. The extent of splaying of the layers furthermost from the contact surface of the plunger is a function, to a certain degree, of the number of layers of preforms in assemblage 214, and the compaction pressure of the plunger.

Figure 4A:
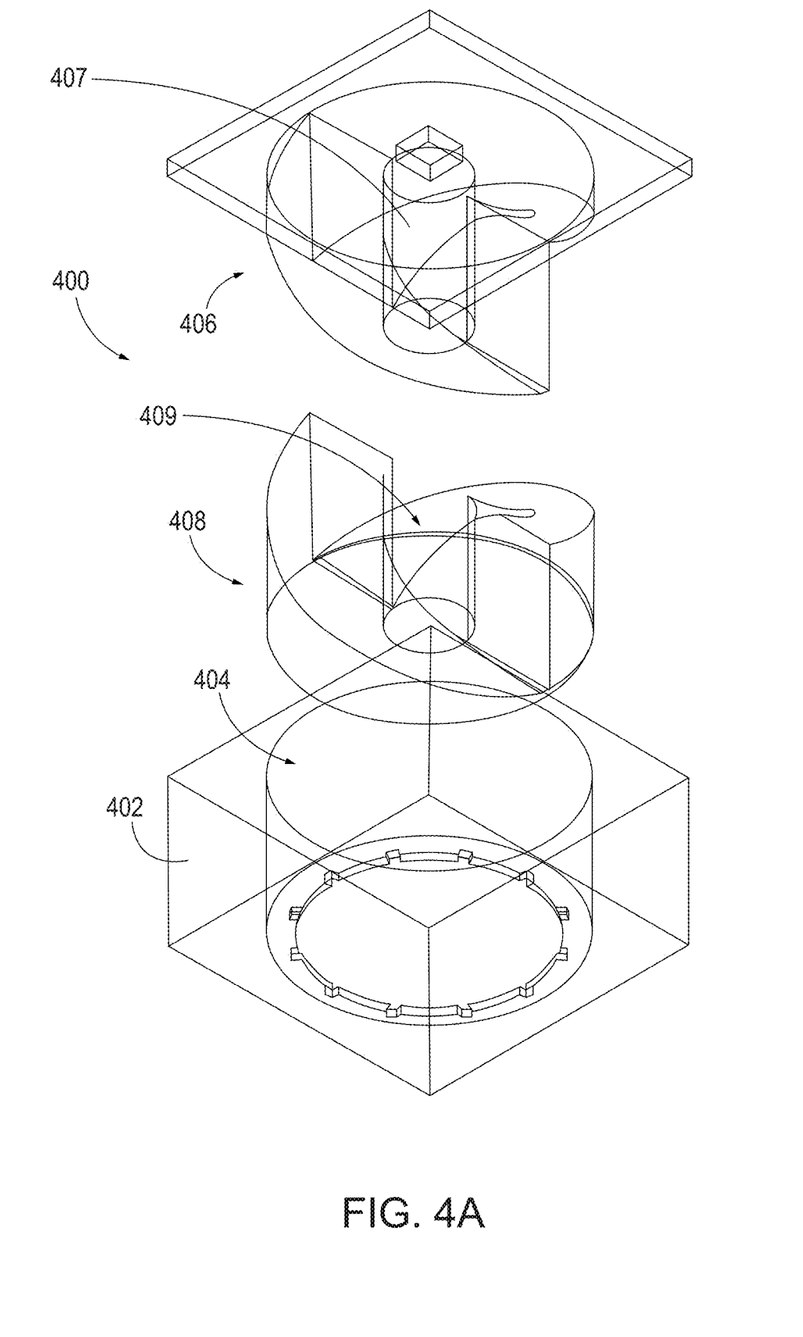
FIG. 4A depicts an exploded view of an apparatus for molding a composite disc in accordance with the present teachings.

FIGS. 4A-4F depict apparatus 400, or parts thereof, for molding a composite disc. FIG. 4A depicts an "exploded" view of apparatus 400, which includes mold 402, rotation actuator 408, and plunger assembly 406. Other elements of the apparatus, such as a heater, are not shown for the sake of clarity.

Figure 4B:
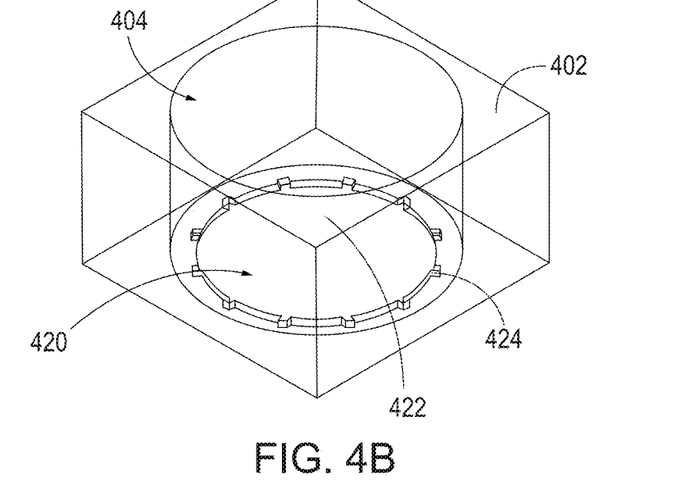
FIG. 4B depicts a mold/mold cavity of the apparatus of FIG. 4A.

Referring now to FIG. 4B, mold 402 includes mold cavity 404. Impression 420, located at the bottom of mold cavity 404, defines the disc-shaped part that is formed by the mold. Impression 420 includes large circular portion 422, and a plurality of small protrusions 424 located around and extending outward from the perimeter of circular portion 422.

Figure 4C:
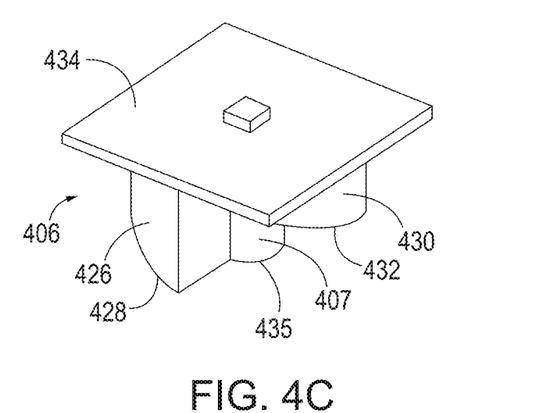
FIG. 4C depicts a plunger of the apparatus of FIG. 4A.

FIG. 4C depicts plunger assembly 406, which includes plunger 407, having preform-contacting surface 435. The plunger assembly further includes two guides, in the form of helical members 426 and 430, arranged in the form of a double helix. Helical member 426 includes surface 428 and helical member 430 includes surface 432. Mold top 434 is attached to the top of plunger 407.

Figure 4D:
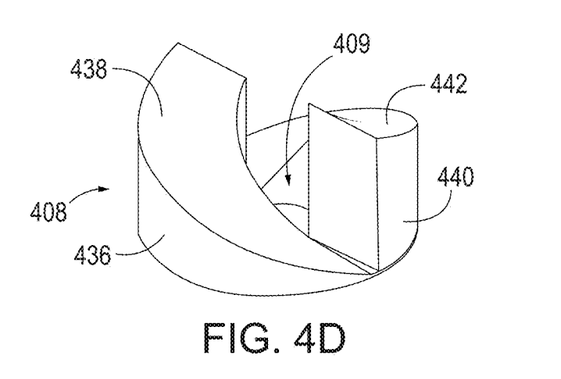
FIG. 4D depicts an actuating device for actuating rotation of the plunger of FIG. 4C.

FIG. 4D depicts rotation actuator 408, which includes two guides, in the form of helical members 436 and 440, arranged in the form of a double helix. Helical member 436 includes surface 438 and helical member 440 includes surface 442.

In operation, rotation actuator 408 and plunger assembly 406 couple to another. For example, surface 428 of the plunger assembly's helical member 426 engages surface 442 of the rotation actuator's helical member 440. And surface 432 of the plunger assembly's helical member 430 engages surface 438 of the rotation actuator's helical member 436.

The helical members are configured so that once coupled, plunger assembly 406 is capable of sliding downwardly along the surfaces of the rotation actuator. This configuration causes the plunger assembly, and plunger 407 in particular, to rotate as it moves downwardly. During the formation of a preform charge or finished part, there will be an assemblage of preforms in the mold tool, and a downward-directed force is applied to plunger assembly 406, such by a press (not depicted). As the plunger assembly is forced downwardly, it twists or partially rotates, so that preform-contacting surface 435 applies both a compressive force and a shear force to the assemblage of preforms in the mold tool.

Figure 4E:
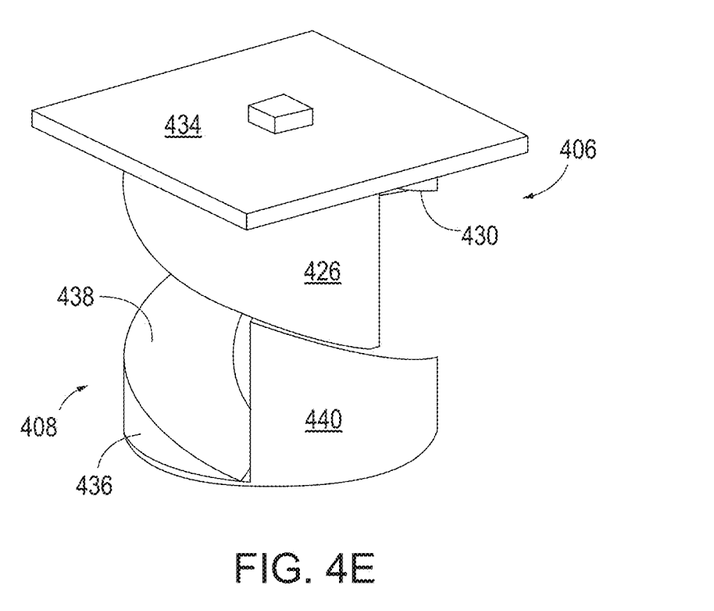
FIG. 4E depicts the plunger of FIG. 4C engaging the actuating device of FIG. 4D.
Figure 5:
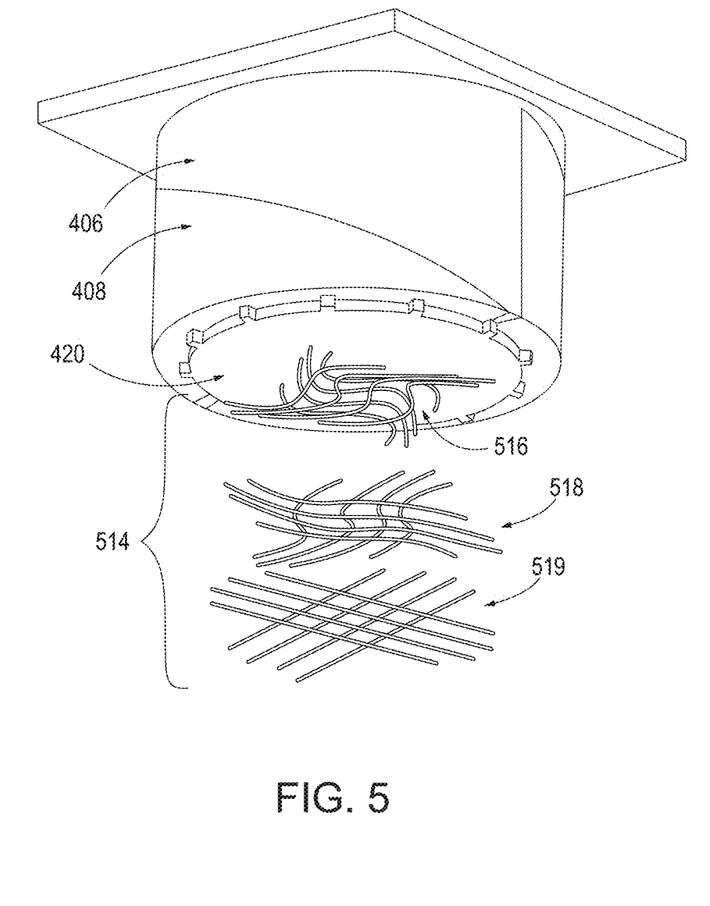
FIG. 5 depicts an exploded view of layers of preforms/fibers, and the relative splaying of the preforms/fibers in each of the layers due to the application of the method.

FIG. 4E depicts initial engagement of plunger assembly 406 and rotation actuator 408. In FIG. 4E, these elements are shown outside of mold cavity 404 for clarity. FIG. 5 depicts full engagement of plunger assembly 406 and rotation actuator 408, such that plunger 407 has twisted or rotated to the full extent enabled by the helical arrangement. Typically, plunger 407 will rotate less than 360° (i.e., less than one full rotation).

Rotation actuator 408 is passive; rotation is driven by the downward force applied by an external press, etc. In some other embodiments, the rotation actuator is located externally and actively driven. For example, in some embodiments, a screw-drive, which creates both rotational and linear (compressive) motion, couples to and actuates the plunger assembly. In such an embodiment, the helical members of plunger assembly 406 are not required.

Figure 4F:
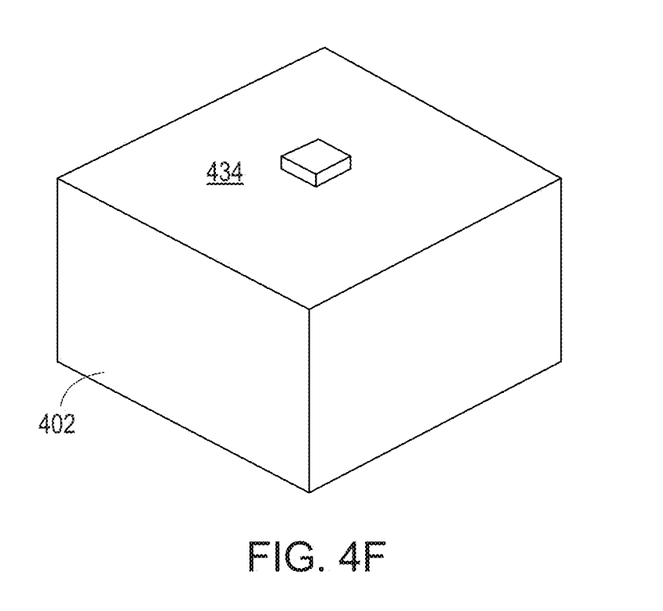
FIG. 4F depicts the apparatus of FIG. 4A fully closed for molding operations.

FIG. 4F depicts apparatus 400 fully closed, with mold top 434 seated on mold 402.

FIG. 5 depicts an exploded view of multi-layer assemblage 515 of preforms, including layers 516, 518, and 519. Since the preforms in layer 516 are in direct contact with the plunger, they receive most of the shear force, and are splayed to a greater extent than the preforms/fibers layers 518 and 519, which are not in direct contact with the plunger. This can be seen via the increasingly linear (i.e., un-splayed) form of the preforms with increasing distance from the contact surface of the plunger.

Figure 6:
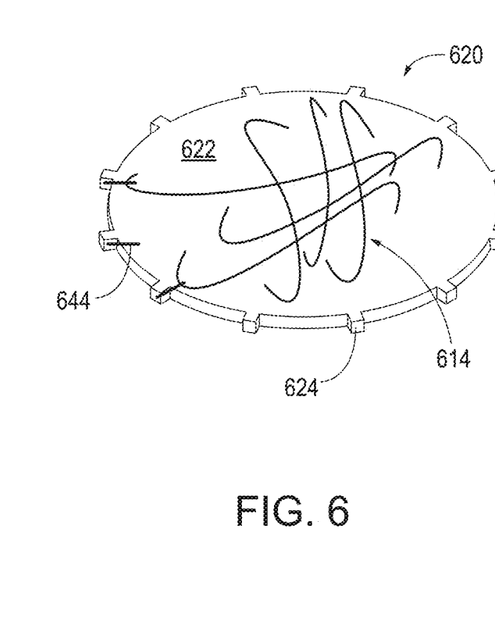
FIG. 6 depicts a composite disc formed from the apparatus of FIG. 4A, using the method of FIG. 3.

FIG. 6 depicts composite disc 620, formed by assembly 400 using method 300. Composite disc 620 includes circular region 622, and a plurality of protrusions 624 that project from the perimeter of circular region 622. Such protrusions would typically interdigitate with appropriately spaced openings in an annular receiving region (not depicted) that receives composite disc 620.

Exemplary fibers 614, which form part of composite disc 620, are depicted for pedagogical purposes (but would typically not be visible since they are present within the solidified matrix of the composite disc). It is notable that the fibers are continuous, and, by virtue of their crossing arrangement, would impart a significant ability for the composite disc to resist forces directed against its major surface (e.g., such as a force directed normal to the disc's surface). Due to the imparted shear stress, the fibers are curved, which desirably decreases the anisotropy of composite disc 620.

Short fibers 644 are depicted as extending into protrusions 624. These fibers are sourced from preforms that are significantly shorter than those from which fibers 614 are sourced. Short fibers 644 are flowed into the protrusions using the methods described, for example, in U.S. Ser. Nos. 16/509,801, 16/597,647, and 16/597,676, which are incorporated herein by reference.

It is to be understood that the disclosure describes a few embodiments and that many variations of the invention can easily be devised by those skilled in the art after reading this disclosure and that the scope of the present invention is to be determined by the following claims.

What is claimed:

1. A method comprising:
providing an assemblage of preforms, each preform in the assemblage comprising resin and a plurality of substantially unidirectionally aligned, and substantially equal length fibers;
heating the assemblage of preforms; and
applying compaction pressure and rotationally induced shear stress to the preforms, wherein:
(a) the assemblage of preforms has configuration that is suitable for splaying via the rotationally induced shear stress;
(b) wherein applying rotationally-induced shear stress comprises partially rotating a plunger that contacts the assemblage of preforms; and
(c) wherein partial rotation of the plunger is passively induced.

2. The method of claim 1 wherein the assemblage of preforms is a lay-up of individual preforms.

3. The method of claim 2 wherein heating the assemblage comprises heating the assemblage to a temperature that is less than a melting temperature of the resin, but which equals or exceeds a heat deflection temperature of the resin.

4. The method of claim 3 wherein applying compaction pressure comprises applying an amount of pressure that is insufficient to fully compact the fibers, resulting in a preform charge having splayed preforms.

5. The method of claim 4 comprising molding a composite disc by applying heat and pressure to the preform charge having the splayed preforms.

6. The method of claim 1 wherein the assemblage of preforms comprises a preform charge.

7. The method of claim 6 wherein heating the assemblage comprises heating the assemblage to a temperature that equals or exceeds a melting temperature of the resin.

8. The method of claim 7 wherein applying compaction pressure comprises applying an amount of pressure that is sufficient to fully compact the fibers, resulting, after cooling, in a composite disc.

9. A method comprising:
providing an assemblage of preforms, each preform in the assemblage comprising resin and a plurality of substantially co-aligned fibers, wherein the assemblage includes a first plurality of layers of preforms in which successive layers thereof are offset from one another by angle $\beta$, wherein $0°<\beta<90°$;
heating the first plurality of layers in the assemblage of preforms; and
splaying the fibers in the preforms of the first plurality of layers by applying rotary compaction—compaction pressure and rotationally induced shear stress—to the preforms, the fibers so splayed having a curved form, wherein the rotary compaction is applied by:
(a) partially rotating a plunger that contacts the assemblage of preforms; and
(b) passively inducing partial rotation of the plunger.

10. The method of claim 9 wherein the assemblage of preforms is a lay-up of individual preforms, and wherein heating the assemblage comprises heating the assemblage to a temperature that equals or exceeds a melting temperature of the resin.

11. A method comprising:
forming a preform charge, the preform charge comprising a plurality of preforms, each preform comprising resin and a plurality of fibers, wherein the preform charge is formed by:
(a) arranging the plurality of preforms in plural layers in which successive layers thereof are offset from one another by angle $\beta$, wherein $0°<\beta<90°$;
(b) heating the resin in the preforms to a temperature that is less than a melt temperature of the resin, but which equals or exceeds a heat deflection temperature of the resin; and
(c) splaying the preforms by applying rotary compaction—compaction pressure and rotationally induced shear stress- to the preforms, the splayed preforms having a curved form, wherein the rotary compaction is applied by:
(i) partially rotating a plunger that contacts the assemblage of preforms, applying an amount of pressure that is insufficient to fully consolidate the preforms; and
(ii) passively inducing partial rotation of the plunger; and
(d) cooling the splayed preforms, thereby causing adjacent preforms to tack together, forming the preform charge.

12. The method of claim 11 comprising molding a composite disc by applying heat and pressure to the preform charge having the splayed preforms.

13. The method of claim 11 wherein, in each layer of the plural layers, the preforms are arranged in a grid pattern.

14. The method of claim 12 wherein the pressure applied during rotary compaction of the preforms is less than the pressure applied to the preform charged during molding of the composite disc.

15. The method of claim 12 wherein the successive layers of preforms are arranged so that fibers are variably splayed through the thickness of the composite disc.

16. A method comprising:
providing an assemblage of preforms, the assemblage comprising a plurality of preforms, each preform comprising resin and a plurality of fibers;
heating the resin in the preforms; and
subjecting a portion, but not all, of the assemblage to rotary compaction by:

(a) partially rotating a plunger that contacts the portion of the assemblage and applies pressure thereto; and
(b) passively inducing partial rotation of the plunger.

17. The method of claim 16 wherein:
heating the resin comprises heating to a temperature that is less than a melt temperature of the resin, but which equals or exceeds a heat deflection temperature of the resin; and
wherein the pressure applied by the plunger is insufficient to fully consolidate the fibers and resin.

18. The method of claim 16 wherein:
heating the resin comprises heating to a temperature heating to a temperature that equals or exceeds a melting temperature of the resin; and
wherein the pressure applied by the plunger is sufficient to fully consolidate the fibers and resin.

* * * * *